United States Patent

[11] 3,602,210

| [72] | Inventor | Jerome Appleton<br>722 N. 3rd St., Kent, Wash. 98031 |
|------|----------|---------|
| [21] | Appl. No. | 837,047 |
| [22] | Filed | June 27, 1969 |
| [45] | Patented | Aug. 31, 1971 |

[54] ABRASIVE IMPREGNATED WHEEL DRESSING APPARATUS
5 Claims, 4 Drawing Figs.

[52] U.S. Cl. .................................................... 125/11 CD, 76/25 R
[51] Int. Cl. .................................................... B24b 53/14, B23d 73/04
[50] Field of Search .......................................... 125/11; 76/25, 37; 143/160; 51/104

[56] References Cited
UNITED STATES PATENTS
3,491,740  1/1970  Kohlstrunk ................... 125/11

| 3,119,420 | 1/1964 | Nelson | 143/160 |
| 3,026,747 | 3/1962 | Johnson | 125/11 X |

FOREIGN PATENTS

| 20,197 | 9/1909 | Great Britain | 76/37 |

*Primary Examiner*—Harold D. Whitehead
*Attorney*—Christensen & Sanborn

ABSTRACT: Apparatus for dressing, smoothing and reshaping the cutting surface of an abrasive impregnated cutting wheel. Apparatus includes a frame member suitable for mounting in the object vise of a cutting machine having a diamond impregnated cutting wheel, a rotatable cylindrical dressing surface mounted on the frame member, and guide means to hold the cutting wheel in proper position. The dressing surface engages the periphery of the cutting wheel under pressure to smooth and shape it by a peening action of the rotating cylindrical dressing surface upon the periphery of the cutting wheel.

PATENTED AUG 31 1971					3,602,210
Fig. 1.
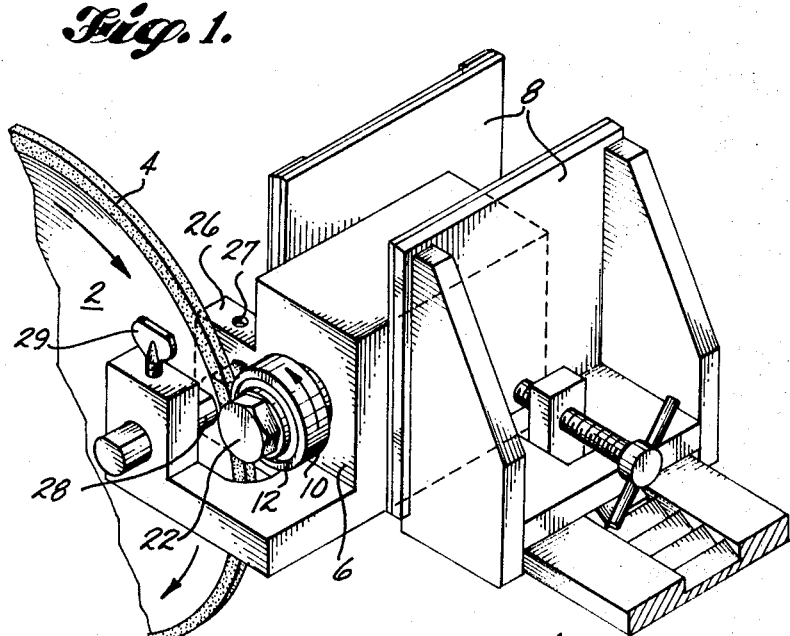
Fig. 2.
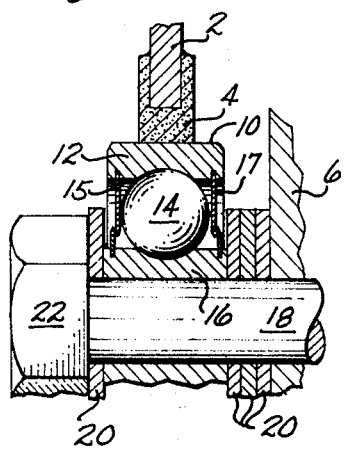
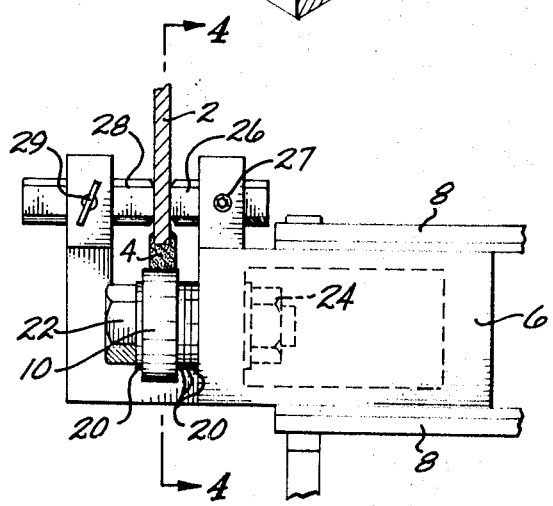
Fig. 3.
Fig. 4.
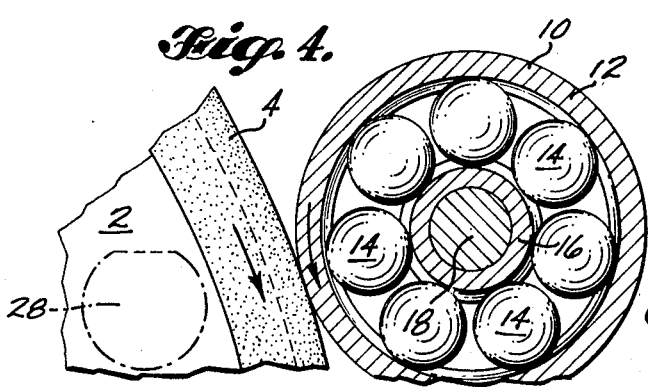
INVENTOR.
JEROME APPLETON
BY
Christensen, Sanborn & Matthews
ATTORNEYS

ABRASIVE IMPREGNATED WHEEL DRESSING APPARATUS

FIELD OF THE INVENTION

This invention relates to apparatus useful in dressing and shaping the cutting surface of a diamond impregnated cutting wheel. In further relates to apparatus useful in renewing the surface of a work or used diamond wheel. This invention specifically contemplates apparatus which is useful in dressing the surface of a diamond knife by a rotative peening action which shapes the diamond impregnated cutting surface and removes surface irregularities.

PRIOR ART

Diamond impregnated cutting surfaces have been widely used in the cutting, shaping, abrading and working of hard crystalline or glassy materials and are used extensively in the lapidary arts.

A diamond impregnated cutting wheel is usually in the form of a thin metal disc which carries a matrix material at its periphery, the matrix material containing many tiny diamond particles which act as the abrasive to abrade and cut every hard materials. The matrix may be a metallic or polymeric material which maintains good structural characteristics at the operating conditions and which will securely hold the diamond particles in position to abrade other materials.

A frequently encountered problem in the use of such cutting wheels or "diamond knives" as they are commonly known in the art, is that repeated usage tends to cause the peripheral surface of the blade, which is initially flat, to become rounded at its periphery, occasionally dented, and frequently worn to the extent that only the matrix material which is used to hold the diamond particles in place is exposed, making the blade ineffective. When the diamond blade or knife reaches such condition it is necessary either to replace it or to have it sent to the manufacturer for refacing of the cutting edge. Heretofore no convenient means of restoring the blade to its new cutting abilities has been available to practitioners of the lapidary art and others who utilize blades of the nature described.

SUMMARY OF THE INVENTION

This invention provides a means for dressing and renewing the cutting edge of a diamond impregnated blade or saw by the peening effect of a rotating surface engaging the edge of the diamond impregnated wheel under pressure as the wheel is rotating. Guide means are provided to prevent sideways motion of the blade during the renewing operation, since the body of the blade is relatively soft and flexible.

These and other features, objects and advantages of the invention will become more fully evident from the following description of the preferred embodiment and by reference to the accompanying drawings.

DRAWINGS

FIG. 1 shows a top perspective view of the device of this invention;

FIG. 2 shows a partial top view of the device of this invention partly in section showing the point of contact between the cutting blade and the dressing tool;

FIG. 3 shows a top view of the device of this invention;

FIG. 4 is a partial cross-sectional view taken along lines 4—4 of FIG. 3.

Referring more particularly to the drawings wherein like numerals indicate like parts, a soft metal blade 2 is shown carrying a diamond impregnated cutting surface 4 at its periphery. A frame member 6 is inserted within the jaws of a vise apparatus 8 which may be moved in and out in a direction perpendicular to the axis of blade 2. The frame member 6 carries a bearing-mounted cylindrical peening surface 10, mounted for rotation, and a pair of blade guides 26 and 28. The cylindrical peening surface 10 is attached to the outer race 12 of a ball-type bearing structure. The individual bearings 14 engage the inner surface of the outer race 12 and the outer surface of the inner race 16. Lubricant may be held inside and foreign matter excluded from the bearing structure by seal members 15 and 17. The inner race 16 is mounted upon shaft 18 which has a bolthead means 22 at one end and tread means disposed at the other end. Shaft 18 is firmly attached to frame 6 with nut 24 and is spaced from frame 6 with several spacers 20.

The opposed blade guides 26 and 28 are mounted in frame 6 so that they may be moved into contact with the opposite sides of blade 2 adjacent to the periphery 4 to guide the blade during the blade dressing operation and provide support thereto. Guide 26 is held in position with setscrew 27 and adjustable guide 28 is held in position with thumbscrew 29, the thumbscrew 24 being provided to facilitate adjustment and setting of the adjustable guide 28.

In operation, the device of this invention is placed into the object vise of a diamond wheel lapidary cutting apparatus as described above with the blade guides adjacent the sides of the cutting wheel. The object vise is moved up until the peening surface 10 engages the periphery 4 of the cutting wheel 2. Rotation of the cutting wheel 2 is initiated and the peening surface 10 driven by frictional contact with the periphery 4 is caused to rotate with the same surface velocity as the periphery 4. A slight additional pressure is then applied to the peening surface 10 by inward motion of the vise 8. As the vise 8 is advanced slowly or incrementally during the dressing operation, the peening surface 10 bears upon the diamond impregnated cutting edge 4 and causes it to flatten out slightly at the surface, forcing the matrix material away from the diamond particles to expose them, thus renewing their ability to abrade and cut much like a new diamond knife. Rotatively peening the surface of the diamond impregnated cutting edge in the above manner causes it to assume the flat shape characteristic of a new diamond wheel and expose a perfectly circular and properly aligned surface for use in cutting hard materials.

The materials which find use as the peening surface for this invention include hardened steels which are frequently used as the outer race of ball bearing or roller bearing devices. Of course any suitably hard, shock-resistant material may be used for this purpose. The materials of construction for the frame and bearing shaft include those materials which are sufficiently rigid and adequately tough to withstand the forces to which the device is subjected. Suitable materials for the frame include cast or rolled metals, injection molded structural plastics, fiber glass reinforced plastic material, wood and other similar structural material. The bearing shaft 18 is preferably a machine bolt or other metal shaft material, but could also be nylon or other structural plastic having sufficient strength for the purpose. The guide elements 26 and 28 are preferably a plastic material having a low coefficient of friction, such as polytetrafluoroethylene and similar fluoro polymers, acetal resins and other plastic materials having relatively high rigidity and resilience. Eminently suitable for this purpose is a special bearing material composed of acetal resin and TFE fluorocarbon fiber known as "Delrin A/F" (Registered trademark of E. I. DuPont de Nemours & Company, Inc. Wilmington, Del.).

The preferred embodiment described in detail above may of course be modified in many minor details by one skilled in the art. For example the basic ball bearing structure described above may be replaced by a roller bearing, needle bearing or other similar bearing structure. The apparatus may be firmly and permanently attached to a machine which is intended to serve only as a diamond impregnated wheel refurbishing device rather than the portable device described above which may be used directly in the movable vise of a lapidary diamond cutting wheel apparatus. The device may of course be used on any type of abrasive impregnated wheel apparatus wherein it is desired to force the matrix material away from the abrasive to renew the abrasive qualities thereof.

I claim:

1. An apparatus for reshaping the periphery of an abrasive impregnated rotating disc mounted for rotation about an axis in a lapidary table having a movable object vise comprising:
   a frame means adapted to be firmly engaged by said object vise;
   a circular cylindrical dressing means adapted to engage and be rotated by contact with said disc mounted for rotation upon said frame means said means comprising the outer race of a bearing means having an inner race mounted on said frame means and a plurality of rolling elements disposed between said inner race and said outer race; and,
   guide means adjustably attached to said frame means and positioned to engage and provide lateral support to each side of said disc at a location adjacent the periphery thereof;
   said dressing means causing a reshaping of a dull, rounded peripheral surface on said disc into a circular cylindrical cutting surface without removal of abrasive impregnated material from said disc when said surface is pressed into rotative engagement with said disc periphery.

2. The apparatus of claim 1 wherein said rolling elements are right circular cylinders.

3. The apparatus of claim 1 wherein said rolling elements are spherical.

4. The apparatus of claim 1 wherein said guide means comprise a pair of arms extending inwardly beyond the periphery of said disc substantially parallel to said disc, and a guide element carried by each of said arms adapted to engage opposite sides of said disc adjacent the periphery thereof.

5. The apparatus of claim 4 wherein said guide elements are constructed of a material having a low coefficient of friction.